United States Patent
Hulick, Jr. et al.

(10) Patent No.: US 11,971,800 B2
(45) Date of Patent: Apr. 30, 2024

(54) AUTOMATED OPEN TELEMETRY INSTRUMENTATION LEVERAGING BEHAVIOR LEARNING

(71) Applicant: Cisco Technology, Inc., San Jose, CA (US)

(72) Inventors: Walter Theodore Hulick, Jr., Pearland, TX (US); Bhuvneshwar Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/743,734

(22) Filed: May 13, 2022

(65) Prior Publication Data

US 2023/0367687 A1   Nov. 16, 2023

(51) Int. Cl.
*G06F 11/34* (2006.01)

(52) U.S. Cl.
CPC .................................... *G06F 11/34* (2013.01)

(58) Field of Classification Search
None
See application file for complete search history.

(56) References Cited

U.S. PATENT DOCUMENTS

| | | | |
|---|---|---|---|
| 7,293,259 B1 * | 11/2007 | Dmitriev | G06F 11/3644 717/130 |
| 7,293,260 B1 * | 11/2007 | Dmitriev | G06F 11/3644 717/130 |
| 7,401,324 B1 * | 7/2008 | Dmitriev | G06F 11/3466 717/130 |
| 8,566,800 B2 | 10/2013 | Gagliardi | |
| 9,027,011 B1 * | 5/2015 | Lam | G06F 11/3409 718/1 |
| 9,672,355 B2 * | 6/2017 | Titonis | H04W 12/12 |
| 10,462,031 B1 * | 10/2019 | Nataraj | H04L 43/0882 |
| 11,030,073 B2 * | 6/2021 | Idicula | G06F 11/3024 |
| 11,256,604 B2 | 2/2022 | Agarwal et al. | |
| 11,822,452 B2 * | 11/2023 | Joshi | G06F 9/542 |
| 2014/0237453 A1 * | 8/2014 | Hulick, Jr. | G06F 8/70 717/127 |

(Continued)

FOREIGN PATENT DOCUMENTS

CN   111190573 A   *   5/2020

OTHER PUBLICATIONS

"OpenTelemetry Instrumentation for Java", online: https://github.com/open-telemetry/opentelemetry-java-instrumentation, accessed May 13, 2022, 6 pages, GitHub.

(Continued)

*Primary Examiner* — Ryan D. Coyer
(74) *Attorney, Agent, or Firm* — BEHMKE INNOVATION GROUP LLC; James M. Behmke; James J. Wong

(57) ABSTRACT

In one embodiment, an illustrative method herein may comprise: listening, by an agent process, to a discovery-based execution of an application; determining, by the agent process, a plurality of transition locations during the discovery-based execution of the application; recording, by the agent process, the plurality of transition locations into a recorded file; and providing, by the agent process, the recorded file to cause injection of instrumentation into the plurality of transition locations during runtime of the application based on the recorded file.

18 Claims, 7 Drawing Sheets

(56) References Cited

U.S. PATENT DOCUMENTS

| | | | |
|---|---|---|---|
| 2016/0078388 A1* | 3/2016 | Himmelreich | G06F 11/34 |
| | | | 709/224 |
| 2017/0109268 A1* | 4/2017 | Liu | G06F 8/70 |
| 2019/0132377 A1* | 5/2019 | Hulick, Jr. | H04L 47/193 |
| 2021/0232485 A1* | 7/2021 | Agarwal | G06F 11/3419 |
| 2021/0247966 A1 | 8/2021 | Hulick, Jr. | |
| 2021/0314342 A1* | 10/2021 | Oberg | H04L 63/20 |
| 2022/0050902 A1 | 2/2022 | Hulick, Jr. | |

OTHER PUBLICATIONS

"Supported libraries, frameworks, application servers, and JVMs", online: https://github.com/open-telemetry/opentelemetry-java-instrumentation/blob/main/docs/supported-libraries.md, accessed May 13, 2022, 7 pages, GitHub.

"Getting Started with OpenTelemetry in Java", online: https://opentelemetry.lightstep.com/java/, accessed Apr. 18, 2022, 11 pages, Lightstep, Inc.

* cited by examiner

```
at org.apache.jasper.compiler.SmapUtil$SDEInstaller.<init>(SmapUtil.java:189)...
at org.apache.jasper.compiler.SmapUtil$SDEInstaller.install(SmapUtil.java:238)...
at org.apache.jasper.compiler.SmapUtil.installSmap(SmapUtil.java:162)...
```
at org.apache.jasper.compiler.JDTCompiler.generateClass(JDTCompiler.java:484)...
```
at org.apache.jasper.compiler.Compiler.compile(Compiler.java:361)...
at org.apache.jasper.compiler.Compiler.compile(Compiler.java:339)...
at org.apache.jasper.compiler.Compiler.compile(Compiler.java:326)...
at org.apache.jasper.JspCompilationContext.compile(JspCompilationContext.java:606)...
at org.apache.jasper.servlet.JspServletWrapper.service(JspServletWrapper.java:308)...
at org.apache.jasper.servlet.JspServlet.serviceJspFile(JspServlet.java:313)...
```
at org.apache.jasper.servlet.JspServlet.service(JspServlet.java:246)...
```
at javax.servlet.http.HttpServlet.service(HttpServlet.java:847)...
at org.apache.catalina.core.ApplicationFilterChain.internalDoFilter...
at org.apache.catalina.core.ApplicationFilterChain.doFilter...
at org.apache.catalina.core.ApplicationDispatcher.invoke...
at org.apache.catalina.core.ApplicationDispatcher.processRequest...
at org.apache.catalina.core.ApplicationDispatcher.doForward...
at org.apache.catalina.core.ApplicationDispatcher.forward...
at org.springframework.web.servlet.view.InternalResourceView....
at org.springframework.web.servlet.view.AbstractView.render (AbstractView.java:304)...
at org.springframework.web.servlet.DispatcherServlet.render...
at org.springframework.web.servlet.DispatcherServlet.processDispatchResult...
at org.springframework.web.servlet.DispatcherServlet.doDispatch...
at org.springframework.web.servlet.DispatcherServlet.doService...
at org.springframework.web.servlet.FrameworkServlet.processRequest...
```
at org.springframework.web.servlet.FrameworkServlet.doGet...
```
at javax.servlet.http.HttpServlet.service(HttpServlet.java:734)...
at org.springframework.web.servlet.FrameworkServlet.service...
```
at javax.servlet.http.HttpServlet.service(HttpServlet.java:847)...
```
at org.apache.catalina.core.ApplicationFilterChain.internalDoFilter...
at org.apache.catalina.core.ApplicationFilterChain.doFilter...
at org.apache.catalina.core.StandardWrapperValve.invoke...
at org.apache.catalina.core.StandardContextValve.invoke...
at org.jboss.as.web.security.SubjectInfoSetupValve.invoke...
at org.jboss.as.web.security.SecurityContextAssociationValve.invoke...
at org.apache.catalina.core.StandardHostValve.invoke(StandardHostValve.java:151)...
at org.apache.catalina.valves.ErrorReportValve.invoke(ErrorReportValve.java:97)...
at org.apache.catalina.core.StandardEngineValve.invoke(StandardEngineValve.java:102)...
```
at org.apache.catalina.connector.CoyoteAdapter.service(CoyoteAdapter.java:343)...
```
at org.apache.coyote.http11.Http11Processor.process(Http11Processor.java:856)...
at org.apache.coyote.http11.Http11Protocol$Http11ConnectionHandler.process...
at org.apache.tomcat.util.net.JIoEndpoint$Worker.run(JIoEndpoint.java:926)...
```
at java.lang.Thread.run(Thread.java:748) [rt.jar:1.8.0_302]...

AUTOMATED OPEN TELEMETRY INSTRUMENTATION LEVERAGING BEHAVIOR LEARNING

TECHNICAL FIELD

The present disclosure relates generally to computer systems, and, more particularly, to automated open telemetry instrumentation leveraging behavior learning.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, full-stack observability (FSO) is beginning to use a technology called Open Telemetry, which is a collection of tools, application programming interfaces (APIs), and software development kits (SDKs) used to instrument, generate, collect, and export telemetry data (metrics, logs, and traces) to help analyze software performance and behavior. Unfortunately, there are many libraries and applications that have not implemented the Open Telemetry API/SDK because it is time consuming to do and monitoring has not been a priority for application developers.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of a stack trace of an application for use with behavior learning.

DESCRIPTION OF EXAMPLE EMBODIMENTS

Overview

According to one or more embodiments of the disclosure, automated open telemetry instrumentation leveraging behavior learning is described herein. An illustrative method herein may comprise: listening, by an agent process, to a discovery-based execution of an application; determining, by the agent process, a plurality of transition locations during the discovery-based execution of the application; recording, by the agent process, the plurality of transition locations into a recorded file; and providing, by the agent process, the recorded file to cause injection of instrumentation into the plurality of transition locations during runtime of the application based on the recorded file. In one embodiment, injection of instrumentation into the plurality of transition locations during runtime of the application based on the recorded file comprises: auto-injecting instrumentation by a local agent on the application at runtime.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
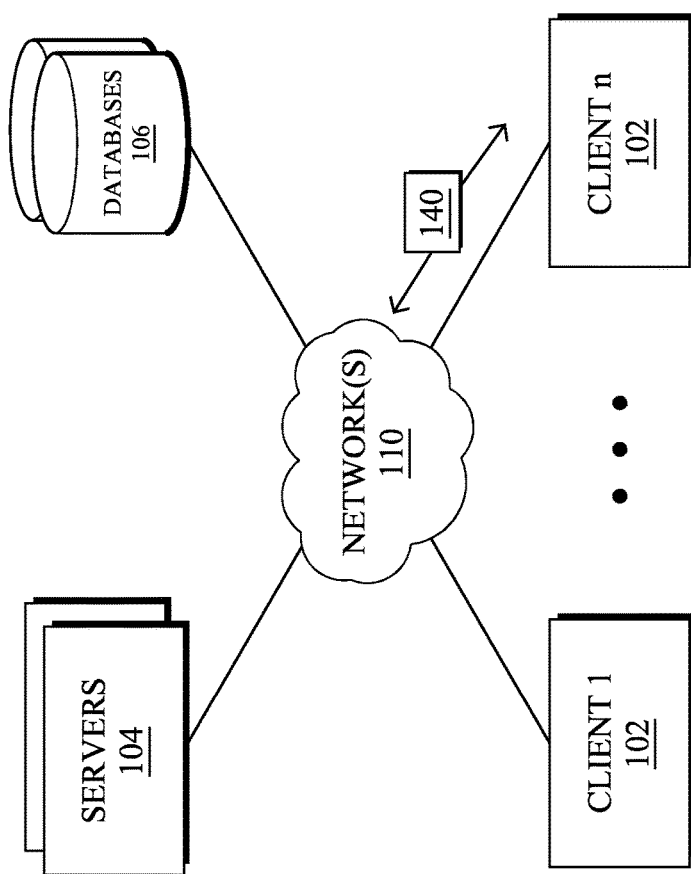
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
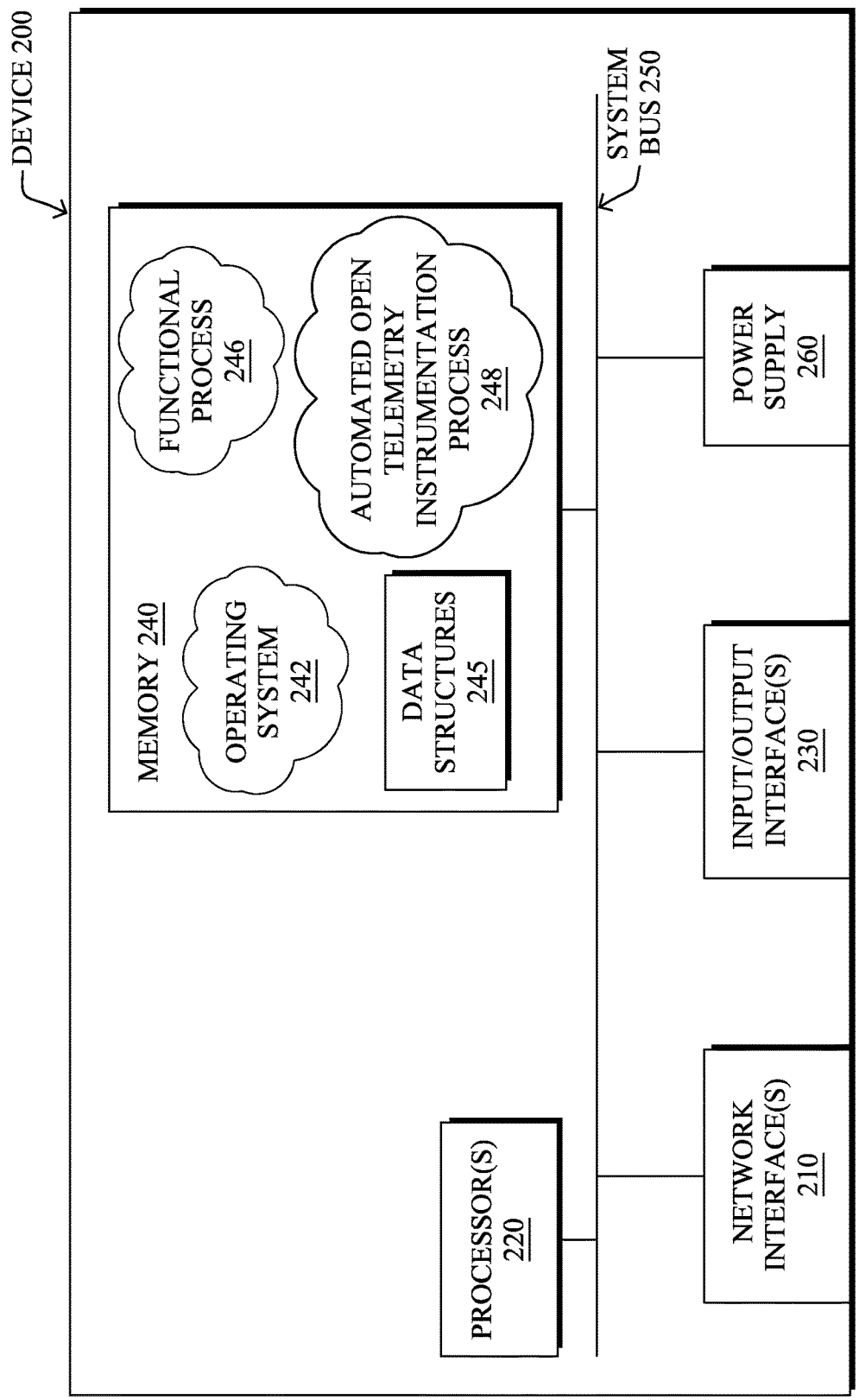
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "automated open telemetry instrumentation" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
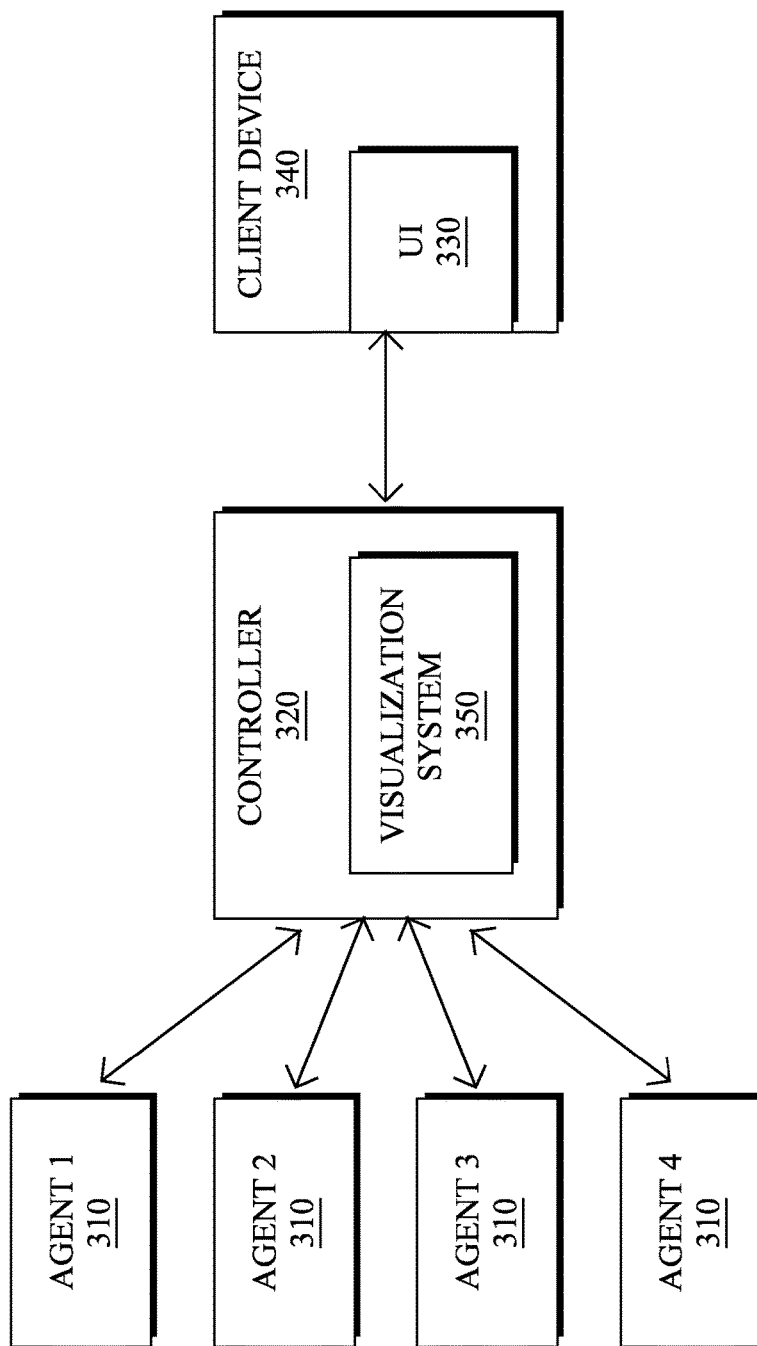
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment.

Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Automated Open Telemetry Instrumentation—

As noted above, Open Telemetry is a collection of tools, APIs, and SDKs used to instrument, generate, collect, and export telemetry data (metrics, logs, and traces) to help analyze software performance and behavior. Unfortunately, there are many libraries and applications that have not implemented the Open Telemetry API/SDK because it is time consuming to do and monitoring has not been a priority for application developers.

The techniques herein, therefore, provide for automated open telemetry instrumentation leveraging behavior learning. As such, the techniques herein automate the Open Telemetry instrumentation for any application and/or framework out of the box with essentially zero human manual intervention by automatically discovering where to inject Open Telemetry Span Tracing. For instance, as described below, the techniques herein provide a discovery mechanism that uses intelligent software to learn (on the fly) where the optimal locations are to create end spans for a trace (span transitions) for insertion of Open Telemetry instrumentation. This may be achieved by attaching and listening to the application and recording determined locations by specifying the class, method, transition type, and line number where are these transitions would make sense. That is, there are certain features within the code itself that make sense to put a transition for instrumentation. Notably, the techniques herein may be performed during development (e.g., a CI/CD pipeline), such as part of a regression test (or other method to hit substantially all endpoints), in order to record transition points, so that the recording is very specific to the exact build of the application. Once recorded, the recording file would then be attached to the application deployment and then be used at runtime to inject the instrumentation (e.g., once at a customer site, these transition points can be used at run time to inject the instrumentation without manual intervention).

Specifically, according to one or more embodiments described herein, an agent process listen to a discovery-based execution of an application, and determines (and records) a plurality of transition locations during the discovery-based execution of the application. By providing the recorded file, the techniques herein may then cause injection of instrumentation into the plurality of transition locations during runtime of the application based on the recorded file (e.g., auto-injecting instrumentation by a local agent on the application at runtime).

Generally, that is, the techniques herein involve a two-step process. The first step is monitoring the application and looking for likely "entry" and "exit points" as these are generally "transitions" between nodes and a great place to "transition" and create a new span. These can be found using basic instrumentation—the techniques herein may instrument at the Socket level which would include all network connections, or alternatively, the techniques herein may limit it to HTTP(S) connections. In either event, these are the primary latency and failure points. In addition, other instrumentation points would be "in process" transitions (e.g., Thread Pools which generally are the core mechanism for allowing resources to transactions). These are also good instrumentation points for a Span as they represent an important transition in the transaction—and in many cases, they will be completely async. The second step is a runtime mode, where agents inject instrumentation into the determined locations.

As described below, therefore, the techniques herein may thus take an application with zero Open Telemetry capability and without human intervention, and have a fully functional and robust Open Telemetry instrumentation system. Compared to current systems, where developers can manually go into an application and add instrumentation to trace transactions, etc., the techniques herein do not require access to the source code, and do not require any manual instrumentation. Also, the techniques herein work without being limited to frameworks where engineers have spent months combing over the locations to instrument for starting/ending spans for the trace (i.e., every framework required someone to download the source and find the locations to inject Open Telemetry API/SDK code for tracing). Clearly, this only works for the frameworks already engineered, and to add new or modified frameworks would require an engineer to go back into the source for the framework and modify the instrumentation rules as needed.

The techniques herein, therefore, alleviate this massive manual effort, and is more accurate, minimizing human errors in the process. The techniques herein also can adapt to application changes/modifications, and work for any application or framework out of the box without ever having seen the source code before.

Figure 4:
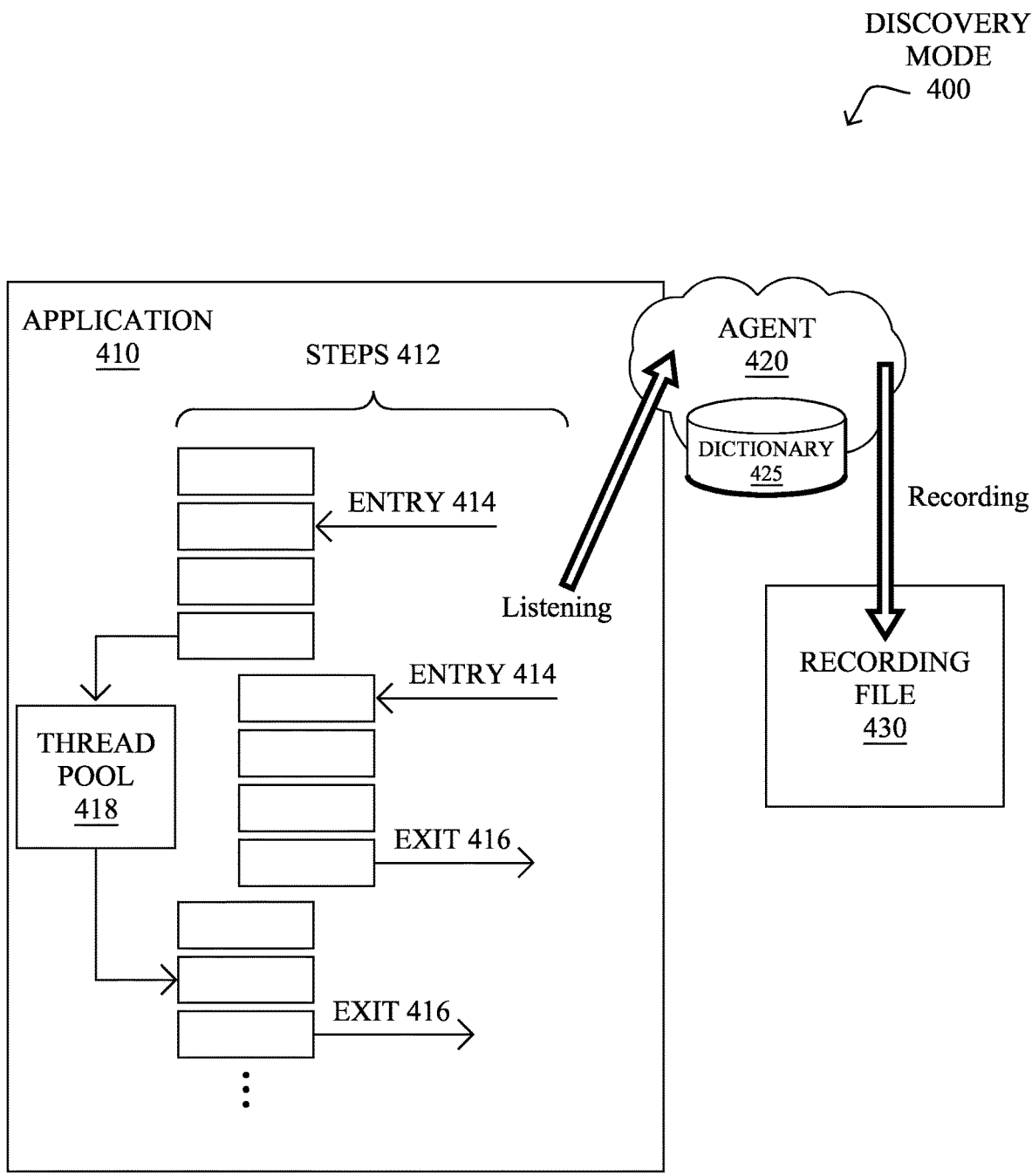
FIG. 4 illustrates an example representation of discovery mode of an application for use with behavior learning.

Operationally, and with reference to FIG. 4 (an example simplified representational view, not meant to imply any particular logical arrangements, orders, priorities, flows, etc.), the first mode herein is a "Discovery Mode" 400 (e.g., in a CI/CD pipeline, staging, etc.). Illustratively, the process herein would be "attached" on startup of a microservice/ application 410 as an agent 420 (e.g., in the case of Java—as a Java Agent similar to how the APM Agent works today). The key REST APIs in the microservice/application may be "exercised" by a tool such as LoadRunner, etc.

The discovery process essentially searches for/listens for various "transition points" within the steps/tasks 412 of the application, which are built into a "dictionary" 425 of classes/methods, that indicate a "new path" in the transaction that is worthy of a "Span Transition", which would essentially create a new autonomous set of key performance indicators (KPIs) for the new span. Illustratively, there are three transition points of significance, though others may be selected herein:

Network Entry 414 into a microservice/application;
Network Exit 416 into a microservice/application;
Standard Thread Pool Execution 418; and
Other items found in the dictionary.

For each of these transitions, in real time, there would an entry written into a "recording file" 430 containing timestamp, transition type, class, method, and line number.

Figure 5:
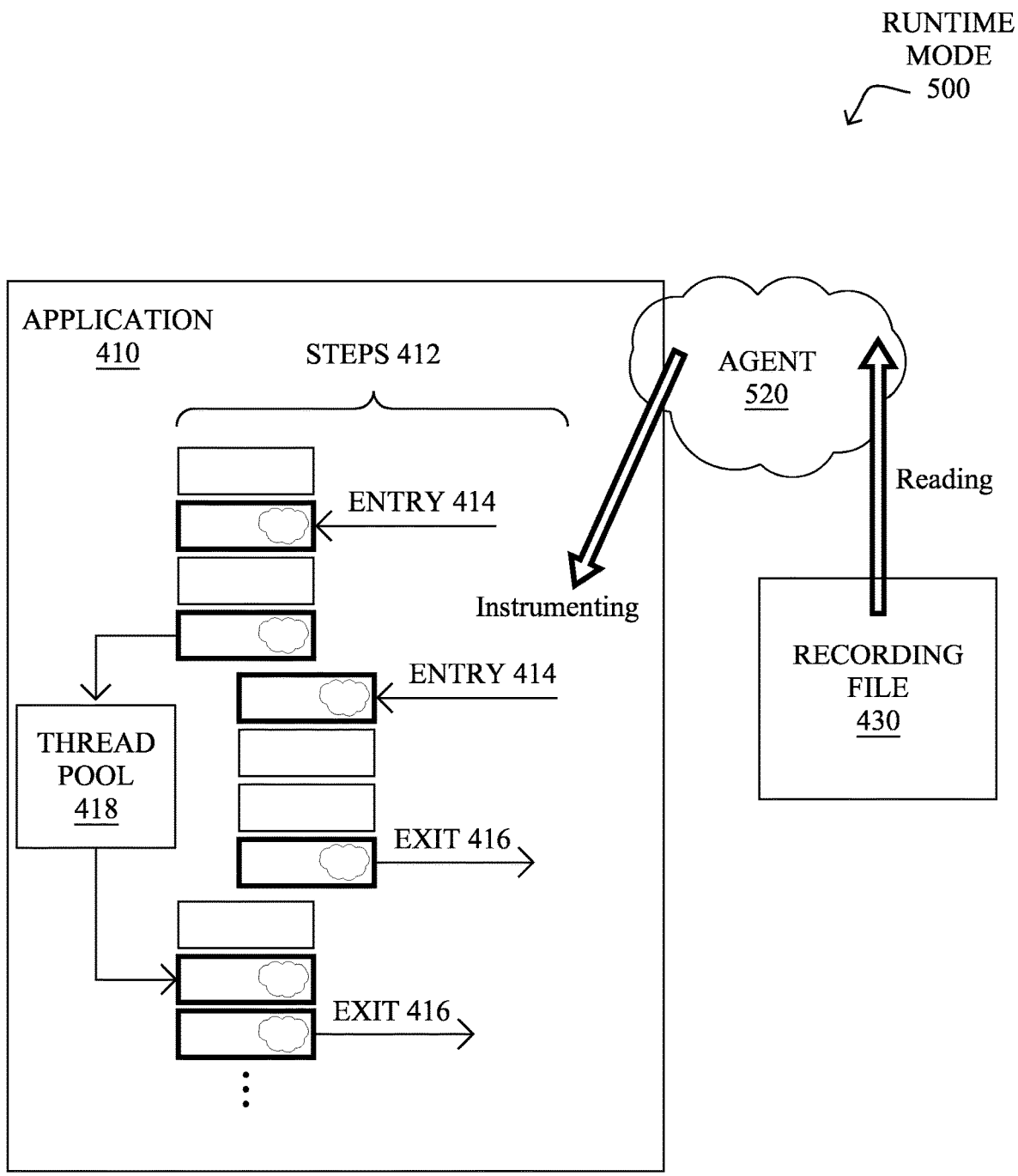
FIG. 5 illustrates an example representation of runtime mode of an application for automated telemetry instrumentation.

Then, as shown in FIG. 5, during a runtime mode 500 (e.g., in production), an agent 520 would be attached to the application 410 (e.g., similar to Discovery Mode), but now the agent performs the following:

Read the recording file 430;
Identify class/method/line number to instrument;
Use the Transition Type to choose the right instrumentation type (create new span, end span, revert back to parent span, etc.); and
Inject Instrumentation (e.g., open telemetry instrumentation) directly into the location (now shown as bolded steps/tasks 412).

At this point, the standard Open Telemetry Pipeline would take over and process the Trace data provided by the instrumentation.

With regard to how the "Transition Point" Dictionary Works (Using a Sample Spring Boot Stack Trace), a key part of the embodiments herein is the fact that the Discovery mode has a built in "dictionary" of "transition points" that it will use to determine whether or not there is a "Span Transition". This Dictionary can be used to define "transition points" which would indicate an idea place to track an "independent" unit of work in span.

The dictionary would include common classes and methods—for instance, as shown in FIG. 6, the ones marked in *bold* (and underlined) in the illustrative stack trace 600. Namely:

at org.apache.jasper.compiler.JDTCompiler.generateClass
at org.apache.jasper.servlet.JspServlet.service
at org.springframework.web.servlet.FrameworkServlet.doGet
at javax.servlet.http.HttpServlet.service
at org.apache.catalina.connector.CoyoteAdapter.service
at java.lang.Thread.run(Thread.java:748) [rt-jar:1.8.0 302]

Essentially, the dictionary would be used in the case to create the following spans:

Thread pool entry to start the request (Thread.run)
Tomcat processing the request (CoyoteAdaptor.service)
Servlet processing the request (HttpServlet.service)
Spring framework Dispatcher processing the request (FrameworkServlet.doGet)
JSP kicking in to generate the web page (JspServlet.service)
JSP compiling the generated class to render the page (JDTCompiler.generateClass)

The end result is a very granular trace which generates detailed spans which significantly outlines where time was spent in the transaction.

Figure 7:
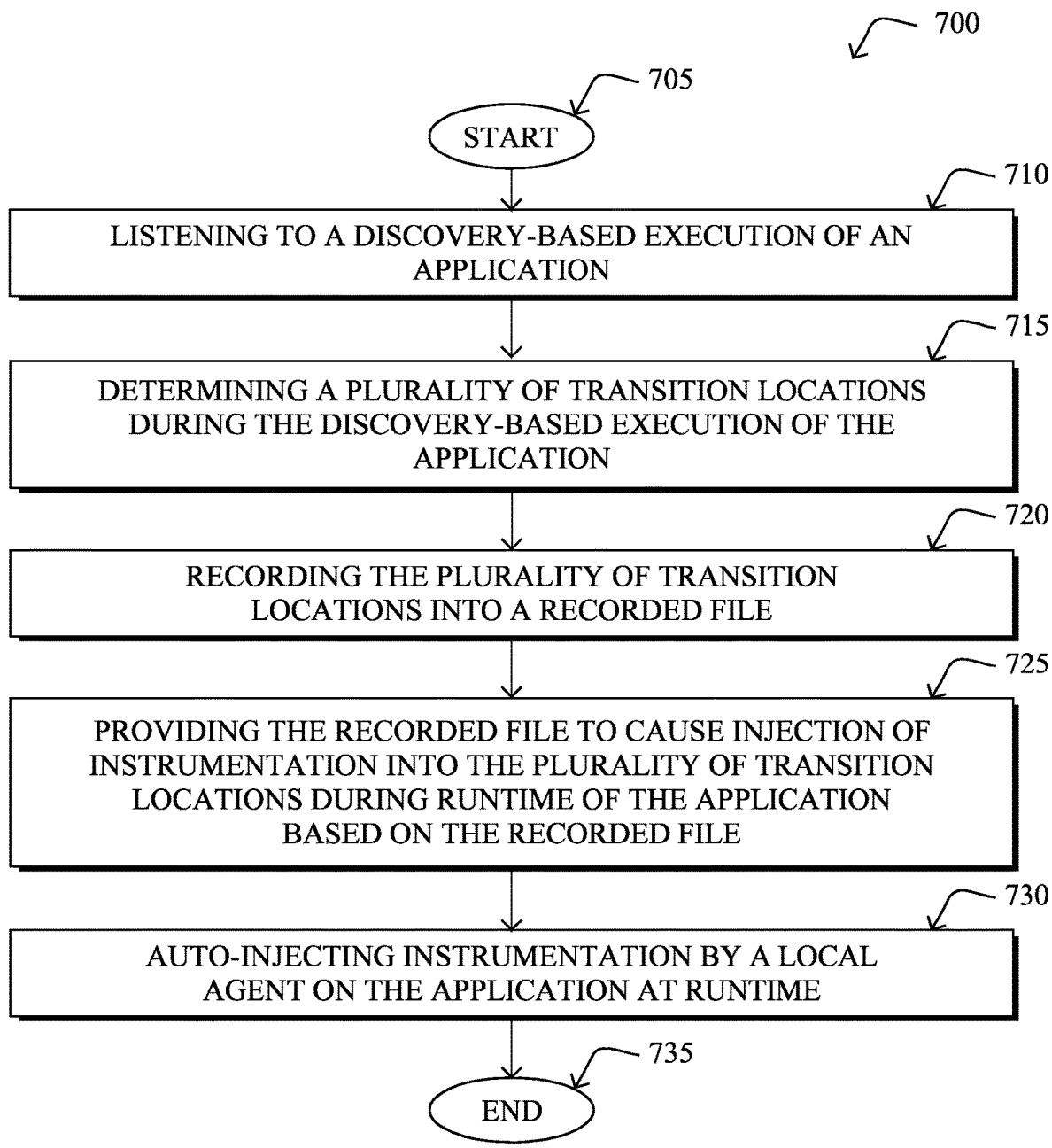
FIG. 7 illustrates an example simplified procedure for automated open telemetry instrumentation leveraging behavior learning in accordance with one or more embodiments described herein.

In closing, FIG. 7 illustrates an example simplified procedure for automated open telemetry instrumentation leveraging behavior learning in accordance with one or more embodiments described herein. For example, a non-generic, specifically configured device (e.g., device 200, in conjunction with an agent 420) may perform procedure 700 by executing stored instructions (e.g., process 248). The procedure 700 may start at step 705, and continues to step 710, where, as described in greater detail above, an agent process (e.g., agent 420) listens to a discovery-based execution of an application/microservice (e.g., based on regression testing of the application). For instance, as mentioned above, the agent process may instrument a socket level of the application (e.g., listening to all network connections or only HTTP connections), and/or may listen for in-process transitions of the application, and so on.

In step 715, the agent process may then determine a plurality of transition locations during the discovery-based execution of the application, such as based on one or more of: entry points into the application; exit points out of the application; thread pool execution for the application; and so on, such as based on the dictionary 425 described above.

In step 720, the agent process may then record the plurality of transition locations into a recorded file (e.g., recording file 430), where, within the file, the agent process may identify the plurality of transition locations by class, method, and line number (e.g., to know where the transition is), and by transition type to cause selection of instrumentation type during injection of instrumentation during runtime, (e.g., create a new span; end a span; and revert back to a parent span).

In step 725, the agent process provides the recorded file (e.g., attaching the recorded file to the application) to cause injection of instrumentation into the plurality of transition locations during runtime of the application based on the recorded file. Note that in one embodiment, in step 730, injection of instrumentation into the plurality of transition locations during runtime of the application based on the recorded file comprises: auto-injecting instrumentation by a local agent on the application at runtime.

The simplified procedure 700 may then end in step 735. Other steps may also be included generally within procedure 700, e.g., as separate steps and/or as additions to steps already specifically illustrated above.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for automated open telemetry instrumentation leveraging behavior learning. In particular, the techniques herein are a much easier, much more flexible, much more scalable and adaptive solution than currently available by the Open Telemetry Community. Also, the techniques herein apply to both applications and frameworks, allowing instrumenting of a customer's application without any need for customer input. As noted above, also, the techniques herein are truly automated, alleviating many hours of labor by engineers and developers, and, in fact, do not need access to the source code at all (only looking at the application and the framework). The "Transition Point" Dictionary is also a vast improvement in terms of the quality of the spans created, generally allowing greater advancement in the adoption of Open Telemetry.

Illustratively, the techniques described herein may be performed by hardware, software, and/or firmware, such as in accordance with the illustrative automated open telemetry instrumentation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

Additionally, the techniques herein may be provided as a software as a service (SaaS) service to companies to "auto instrument" their deployment with Open Telemetry regardless of changes—regardless of frameworks used. The techniques herein may also be provided as CI/CD plugins.

According to the embodiments herein, an illustrative method herein may comprise: listening, by an agent process, to a discovery-based execution of an application; determining, by the agent process, a plurality of transition locations during the discovery-based execution of the application; recording, by the agent process, the plurality of transition locations into a recorded file; and providing, by the agent process, the recorded file to cause injection of instrumentation into the plurality of transition locations during runtime of the application based on the recorded file.

In one embodiment, injection of instrumentation into the plurality of transition locations during runtime of the application based on the recorded file comprises: auto-injecting instrumentation by a local agent on the application at runtime.

In one embodiment, providing comprises: attaching the recorded file to the application.

In one embodiment, the plurality of transition locations are based on one or more of entry points into the application, exit points out of the application, and thread pool execution for the application.

In one embodiment, the method further comprises: identifying, within the recorded file, the plurality of transition locations by transition type to cause selection of instrumentation type during injection of instrumentation during runtime. In one embodiment, instrument type is selected from a group consisting of: create a new span; end a span; and revert back to a parent span.

In one embodiment, the method further comprises: identifying, within the recorded file, the plurality of transition locations by class, method, and line number.

In one embodiment, the application is a microservice.

In one embodiment, the discovery-based execution of the application is based on regression testing of the application.

In one embodiment, listening to the discovery-based execution of an application comprises: instrumenting a socket level of the application. In one embodiment, the method further comprises: listening to all network connections. In one embodiment, the method further comprises: listening to only hypertext transfer protocol (HTTP) connections.

In one embodiment, listening to the discovery-based execution of an application comprises: listening for in-process transitions of the application.

According to the embodiments herein, an illustrative tangible, non-transitory, computer-readable medium herein may have computer-executable instructions stored thereon that, when executed by a processor on a computer, may cause the computer to perform a method comprising: listening to a discovery-based execution of an application; determining a plurality of transition locations during the discovery-based execution of the application; recording the plurality of transition locations into a recorded file; and providing the recorded file to cause injection of instrumentation into the plurality of transition locations during runtime of the application based on the recorded file.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: listen to a discovery-based execution of an application; determine a plurality of transition locations during the discovery-based execution of the application; record the plurality of transition locations into a recorded file; and provide the recorded file to cause injection of instrumentation into the plurality of transition locations during runtime of the application based on the recorded file.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   listening, by an agent process, to a discovery-based execution of an application;
   determining, by the agent process, a plurality of transition locations during the discovery-based execution of the application;
   recording, by the agent process, the plurality of transition locations into a recorded file;
   identifying, by the agent process and within the recorded file, the plurality of transition locations by transition types; and
   providing, by the agent process, the recorded file to runtime of the application to cause selection of instrumentation type of Open Telemetry instrumentation and injection of the Open Telemetry instrumentation into the plurality of transition locations during the runtime of the application based on the recorded file.

2. The method as in claim 1, wherein injection of instrumentation into the plurality of transition locations during runtime of the application based on the recorded file comprises:
   auto-injecting instrumentation by a local agent on the application at runtime.

3. The method as in claim 1, wherein providing comprises:
   attaching the recorded file to the application.

4. The method as in claim 1, wherein the plurality of transition locations are based on one or more of: entry points into the application; exit points out of the application; and thread pool execution for the application.

5. The method as in claim 1, wherein Open Telemetry instrument type is selected from a group consisting of: create a new span; end a span; and revert back to a parent span.

6. The method as in claim 1, further comprising:
   identifying, within the recorded file, the plurality of transition locations by class, method, and line number.

7. The method as in claim 1, wherein the application is a microservice.

8. The method as in claim 1, wherein the discovery-based execution of the application is based on regression testing of the application.

9. The method as in claim 1, wherein listening to the discovery-based execution of an application comprises:
   instrumenting a socket level of the application.

10. The method as in claim 9, further comprising:
    listening to all network connections.

11. The method as in claim 9 further comprising:
    listening to only hypertext transfer protocol (HTTP) connections.

12. The method as in claim 1, wherein listening to the discovery-based execution of an application comprises:
    listening for in-process transitions of the application.

13. A tangible, non-transitory, computer-readable medium having computer-executable instructions stored thereon that, when executed by a processor on a computer, cause the computer to perform a method comprising:
    listening to a discovery-based execution of an application;
    determining a plurality of transition locations during the discovery-based execution of the application;
    recording the plurality of transition locations into a recorded file;
    identifying, within the recorded file, the plurality of transition locations by transition types; and
    providing the recorded file to runtime of the application to cause selection of instrumentation type of Open Telemetry instrumentation and injection of the Open Telemetry instrumentation into the plurality of transition locations during the runtime of the application based on the recorded file.

14. The tangible, non-transitory, computer-readable medium as in claim 13, wherein injection of instrumentation into the plurality of transition locations during runtime of the application based on the recorded file comprises auto-injecting instrumentation by a local agent on the application at runtime.

15. The tangible, non-transitory, computer-readable medium as in claim 13, wherein providing comprises:
    attaching the recorded file to the application.

16. The tangible, non-transitory, computer-readable medium as in claim 13, wherein the plurality of transition locations are based on one or more of: entry points into the application; exit points out of the application; and thread pool execution for the application.

17. The tangible, non-transitory, computer-readable medium as in claim 13, wherein listening to the discovery-based execution of an application comprises one or both of:
    instrumenting a socket level of the application; and
    listening for in-process transitions of the application.

18. An apparatus, comprising:
    one or more network interfaces to communicate with a network;
    a processor coupled to the one or more network interfaces and configured to execute one or more processes; and a memory configured to store a process that is executable by the processor, the process, when executed, configured to:
listen to a discovery-based execution of an application;
determine a plurality of transition locations during the discovery-based execution of the application;
record the plurality of transition locations into a recorded file;
identify, within the recorded file, the plurality of transition locations by transition types; and
provide the recorded file to runtime of the application to cause selection of instrumentation type of Open Telemetry instrumentation and injection of the Open Telemetry instrumentation into the plurality of transition locations during the runtime of the application based on the recorded file.

* * * * *